United States Patent [19]

Leonard

[11] Patent Number: 4,681,307

[45] Date of Patent: Jul. 21, 1987

[54] SOCKET CONSTRUCTION FOR TORSION MEMBER

[75] Inventor: George H. Leonard, Darien, Conn.

[73] Assignee: Airpot Corporation, Norwalk, Conn.

[21] Appl. No.: 770,614

[22] Filed: Aug. 29, 1985

[51] Int. Cl.[4] ............................................. F16F 1/16
[52] U.S. Cl. ..................................... 267/154; 16/308;
267/57; 280/721; 403/334; 403/359; 403/361;
403/383
[58] Field of Search ................ 267/57, 154, 155, 156,
267/157; 16/308; 403/334, 359, 361, 383;
280/695, 700, 721

[56] References Cited

U.S. PATENT DOCUMENTS 2,606,020  8/1952  Anderson ............................. 267/57
2,778,626  1/1957  Klepp ................................. 267/154
4,571,775  2/1986  Leonard ........................... 267/57 X

FOREIGN PATENT DOCUMENTS 166007  1/1959  Sweden ................................. 267/57

Primary Examiner—George E. A. Halvosa
Attorney, Agent, or Firm—James & Franklin

[57] ABSTRACT

The socket for non-rotatably receiving a torsion member is so shaped that points of engagement between the external surfaces of the torsion member and the internal surfaces of the socket member travel as the torsion member is twisted, thereby greatly to increase the life of the torsion member.

14 Claims, 8 Drawing Figures

SOCKET CONSTRUCTION FOR TORSION MEMBER

This invention relates to the shaping of the socket for a torsion member, and particularly one of polygonal cross-section, in order greatly to increase the life of that torsion member.

It has long been known that torsion members may be used to produce resisting spring forces in response to twisting of the member. The member is usually held rotationally fixed at one point and is twisted at another point by turning an element which is rotationally fixed to the torsion member at that other point. Devices of this type have long been used as springs in various applications, particularly including counterbalancing devices. In those applications it is usually the case that the torsion member is subjected to torsion very frequently, and over a long period of time. Thousands of torsion cycles are the rule rather than the exception.

Experience with torsion devices of the type under discussion has revealed that a major problem area insofar as longevity of these devices is concerned occurs at or near the location where the torsion element is non-rotatively engaged. Weakening or failure of the torsion member occurs more frequently at such locations than elsewhere along the length of the torsion member, and this has proved to be a very significant limitation on the accuracy and repeatability of functioning of devices utilizing such torsion members. Such accuracy and repeatability are important, particularly where the device is used for the supporting of a cabinet lid in open position; if the torsion member is affected by wear the lid will sag or droop from its normal open position, thereby restricting access to the interior of the cabinet.

In the past one preferred method of non-rotatably engaging a torsion member with a polygonal periphery was to insert the torsion member into a socket member having an essentially congruently shaped aperture so that at least some of the aperture walls engage corresponding sides of the torsion member periphery, with that engagement occurring over an appreciable depth. This did provide for firm and reliable engagement between the socket member and the torsion member, which was thought to be advantageous.

However, it has been observed that in use deterioration of the torsion member occurred at or close to the point where the torsion member emerged from the relatively deep socket aperture into which it was received, and such deterioration was in many instances the main factor limiting the longevity of the unit.

I have discovered that by redesigning the socket for a torsion member, and particularly one of given polygonal periphery, so that the engagement between the aperture walls and the torsion member sides varies in particular ways as the torsion member is twisted, the effective life of the torsion member is greatly enhanced. More specifically, I have noted that as the torsion member is twisted it tries to move laterally within the socket member aperture and also tries to move circumferentially therein even though the innermost portion of the torsion member remains stationary with respect to the socket member. I have determined that if the socket aperture is so shaped as to permit such movements to a limited degree, the localized wear on the torsion member is eliminated, preventing the notch sensitivity effect, thought to be attributable to overstressing and the production of nicks, which is the most common cause of low cycle fatigue life. Hence, the high localized stress levels associated with the notch effect which would normally be generated in a standard shaped aperture are avoided, thus vastly increasing life of the torsion members and socket elements.

It is a prime object of the present invention to devise a non-rotatable mounting for a torsion member, and particularly one having a polygonal periphery which optimally accommodates the stresses exerted on the members, and which provides maximum life for a socket member which retains polygonal torsion rods.

To those ends, the socket aperture is flared sufficiently toward its open end so that when the torsion member is relatively untensioned the socket aperture engages it relatively deep within that aperture with the portion of the torsion member extending therefrom toward the open end of the socket aperture being somewhat spaced from the aperture walls, but with that spacing being sufficiently small so that as the torsion member is further twisted, the portion captured within the socket progressively engages additional surface area of the aperture walls, thus uniformly and continuously distributing the load bearing engagement such that the amount of area engaged is substantially proportional to the amount of twist occurring in the torsion members. As the amount of twist in the torsion member increases the force required to produce that twist increases, and the fact that the socket surface area resisting that force increases substantially proportionally to the increase in the force contributes greatly to the increase in effective accurate life of the torsion member.

Further, it has been found advantageous to make the aperture surfaces, when viewed in the direction of the axis of the aperture, incline outwardly with respect to the outer surfaces of the torsion member in the direction of twist of that torsion member, with the outer surfaces of the torsion member at the maximum depth level within the aperture initially engaging that aperture surface more or less at the high point of the aperture surface when the torsion member is relatively untwisted and that area of engagement shifting at that level from that high point to the outwardly inclined surface as the torsion member is further twisted, so that in effect the torsion member is to some extent rolling over the aperture wall which it engages. A comparable action may occur at progressively higher levels within the aperture as the torsion member is still further twisted. In those instances where, as is here specifically disclosed, the socket is designed to accommodate torsion members which might be twisted either in one direction or the other, the aperture surfaces comprise a substantially central high point with outwardly inclined surfaces extending in both lateral directions, therefrom, thereby producing what might be called a convex configuration (the term "convex" as here used encompasses configurations defined by a plurality of straight lines as well as by one or more arcuate lines).

To the accomplishment of the above, and to such other objects as may hereinafter appear, the present invention relates to a structure for the non-rotatable mounting of a torsion member, and particularly one having a polygonal periphery, as defined in the following claims and as described in this specification, taken together with the accompanying drawings, in which:

FIG. 1 is a front elevational view of the counterbalance device of application Ser. No. 722,754, now U.S. Pat. No. 4,621,391 showing one embodiment in which the present invention can be used;

Figure 5:
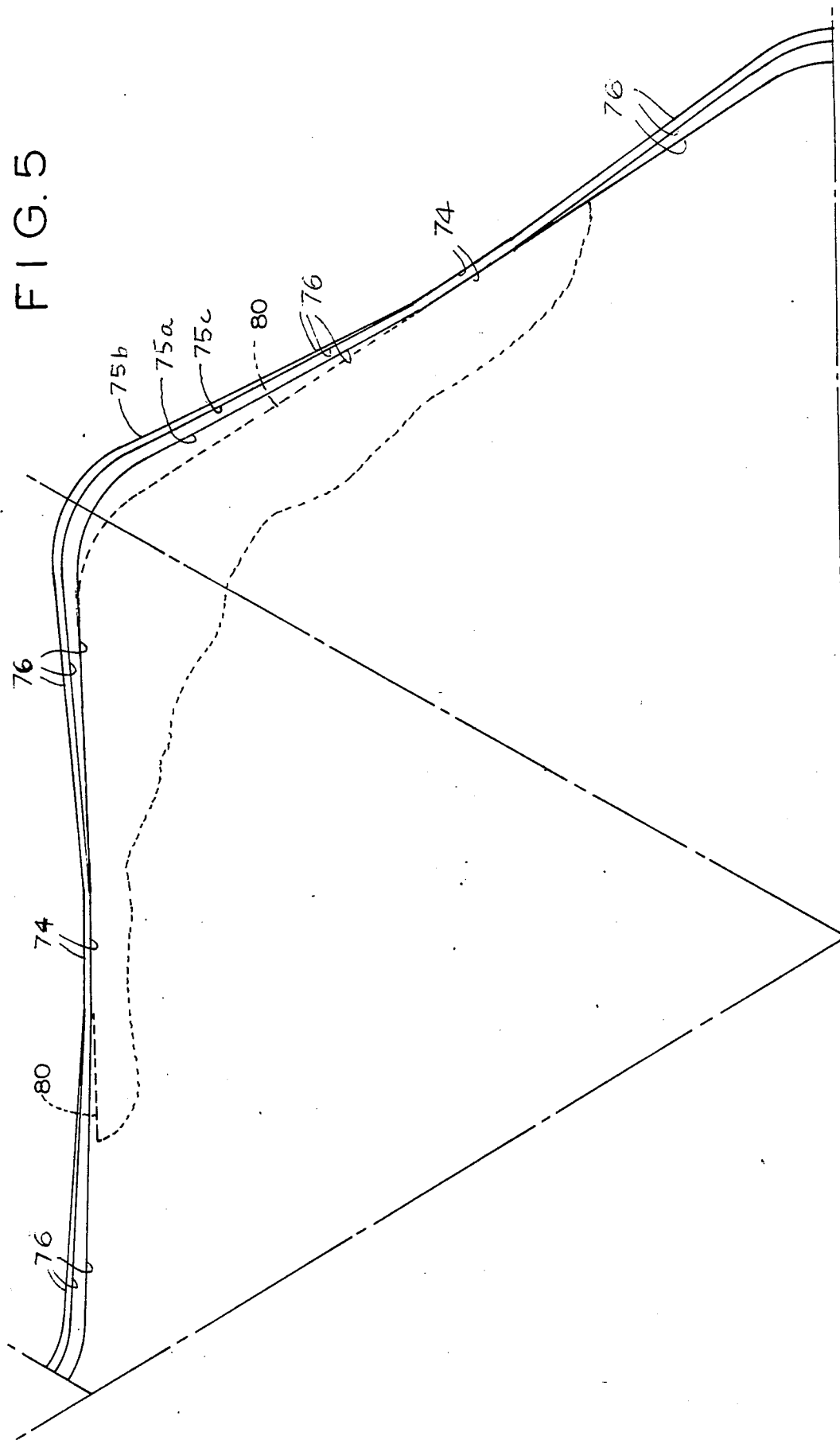
Figure 6:
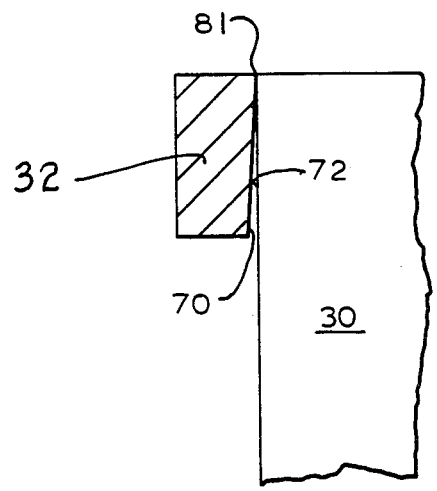
Figure 7:
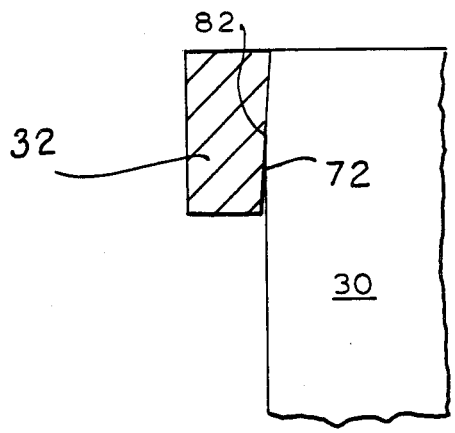
Figure 8:
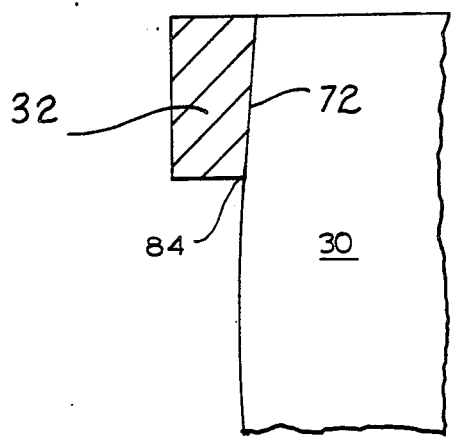

FIG. 5 is a diagrammatic view, on a greatly enlarged scale, graphically indicating a typical configuration of the socket aperture walls at different depths within the socket, a typical configuration of a portion of the torsion member periphery at a selected depth being shown in broken lines; and FIGS. 6, 7 and 8 are explanatory diagrammatic views illustrating one aspect of the torsion member-socket aperture engagement as the torsion member is twisted from the position shown in FIG. 6 through the position shown in FIG. 7 to the position shown in FIG. 8.

The present invention is here disclosed by way of example as embodied in a particular variable tension device used as a counterbalance, which is the embodiment of FIGS. 15–19 of my copending application Ser. No. 722,754 filed Apr. 12, 1985, now U.S. Pat. No. 4,621,391 entitled "Torsion Spring Mounting Structure" and assigned to the assignee of this application. Other torsion devices of that general type to which this invention is also applicable are disclosed in the earlier figures of that application, as well as in my applications Ser. No. 712,757 filed Mar. 18, 1985, now U.S. Pat. No. 4,571,775 entitled "Counterbalance Device and Torsion Member Usable Therein", and Ser. No. 618,897 filed June 8, 1984, now U.S. Pat. No. 4,589,164 and entitled "Variable Tension Device With Adjustable Features For Spring Rate, Initial Tension and Connection to External Parts", both of which are assigned to the assignee of this application. It will be understood, however, that the subject matter of this application has applicability to torsion devices other than those specifically disclosed in the patent applications mentioned.

Figure 1:
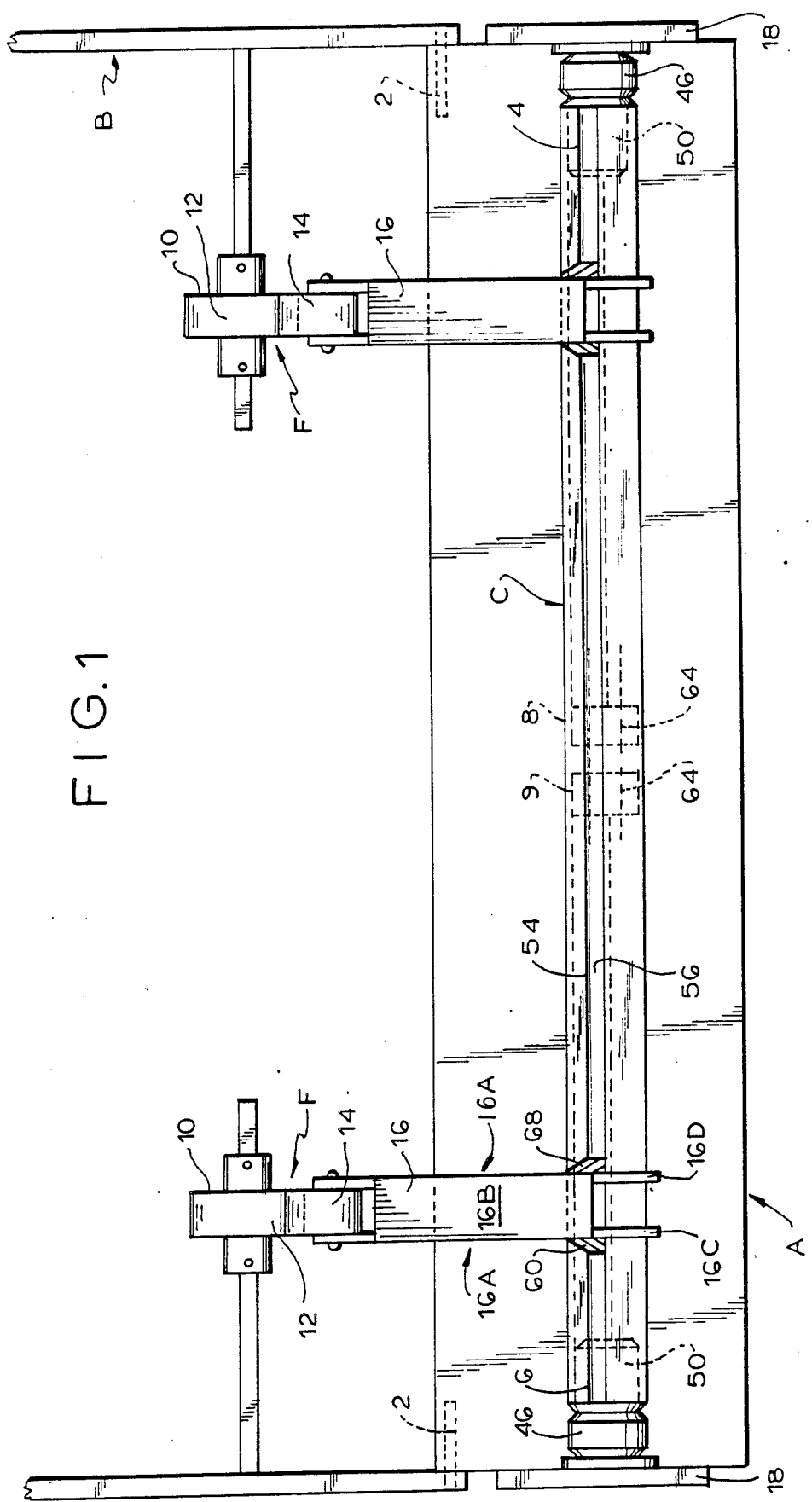

The variable tension device of the present invention, as has been indicated, is here specifically disclosed in an environment where it is designed to counterbalance two articulating connected parts generally designated A and B, here shown more or less generically because of the wide variation possible in the nature of those parts. Part A is the fixed part, and part B is the movable part which is to be counterbalanced. Part B is pivotally connected to part A by pivot axis or shaft 2 to move between a horizontal position corresponding to a closed lid and a vertical position corresponding to an open lid. Part B may be of appreciable weight. When it is in its vertical position shown in FIG. 1 that weight is wholly carried by the shaft 2, so little or no force is required to move the lid from its vertical position, but when the lid is in its horizontal position its weight acts downwardly at points remote from the shaft 2, so that a considerable amount of force is required to lift it. As the lid B is moved from its horizontal to its vertical position, the amount of force required to move it will progressively decrease, according to the cosine of the angle through which it is moved. What is desired is to counterbalance the part B, so that it will tend to remain in whatever position it may be placed, the counterbalancing force equalling and opposing the effective weight of the part B for that particular position.

The variable tension device of the present invention comprises an elongated torsion member generally designated D which, in the balanced or symmetrical form shown, is non-rotatably secured adjacent to its ends, at points generally designated 4 and 6 respectively, to the fixed part A. The torsion member D is surrounded by a sleeve generally designated C, which is rotatable relative to the fixed part A generally independently of the torsion member D but which is non-rotatably secured to the torsion member D at points 8 and 9 spaced, preferably equidistantly, from the points 4 and 6 respectively. Such rotation of the sleeve C with respect to the fixed support A will twist those lengths of the torsion member D between the points 4 and 8 and the points 6 and 9 respectively, and that torsion member will therefore exert a restraining force at least roughly proportional to the degree to which it is twisted.

A cam-follower combination generally designated F is provided, one part of which is secured to the sleeve C and the other part of which is secured to the part B. As here disclosed the part B carries a cam 10 having a cam surface 12 over which a cam follower 14 rides, the cam follower 14 being mounted on the sleeve C by means of arm 16. Because of the desired symmetrical or balanced nature of the construction shown, two sets of cam-follower combinations F are provided, one near each end of the sleeve C. The cam mounting shown is illustrative only. The cam surface 12 may be configured to provide, within limits, a wide variety of different position-spring action relationships, i.e., detenting, balancing, biasing in one direction or the other, etc.

At each end of the torsion member D an adjustable mounting structure generally designated G is provided, by means of which the ends of the torsion member D may be fixed to the part A in any one of a plurality of desired rotative anchor positions. As here specifically disclosed, for the fixed part of that mounting structure the part A defining the support for the device is provided with a mounting block 18 extending out from the part A. That mounting block 18 is provided with a recess 20 provided with internally extending teeth 24.

The torsion member D is here shown as formed of three elongated metal rods 30 assembled with peripheral surfaces in engagement according to the teachings of the aforementioned application Ser. No. 618,897. Sleeve-like socket members 32 are loosely axially slidably mounted on the torsion member D near its ends. Hereafter only one end structure will be described, it being understood that the construction is similar at both ends.

Because the inner opening of element 32 (hereinafter to be described more in detail) mates with the non-circular periphery of the bunched group of rods 30 on which it is mounted, it is non-rotatable relative to that portion of the torsion member D which it engages. The outer periphery of the socket member 32 is provided with external teeth 34, the part 32 being received within the central through aperture 36 of a ring 38 with the teeth 34 engaging the internal teeth 40 of the ring 38. The ring has external gear teeth 39. All of the teeth in question may be of conventional near gear teeth shape, but that is not essential, it being necessary only that the teeth of each set when engaged with one another limit relative rotation, the engagement preferably providing appreciable looseness so that the intermeshing of the teeth can readily be accomplished when adjustment is desired.

The socket member 32 has a smooth-surfaced cylindrical end part 42 which is rotatively received within a correspondingly sized and shaped recess 44 in bushing 46, that bushing having a central aperture 48 and an axially extending part 50 with longitudinally extending external grooves 52. The sleeve C is received snugly over and rotates with the part 50 of the bushing 46, which is in turn journaled on end part 42 of part 32. While the sleeve C may take a number of forms, it is preferred that it have a fluted cross-sectional shape, thus defining, extending axially along its length, outward projections 54 and inward projections 56. The arms 16 which carry the cam followers 14 are keyed to the sleeve C for rotation therewith by having apertures shaped to mate with the longitudinally extending external flutes of the sleeve C formed by the projections 54 and 56. This enables the arms 16 to be slid along the length of the sleeve C to that position where, in a given installation, the cooperating cams 10 are located. In order to assist in retaining the arms 16 in their desired axial position relative to the sleeve C, the arms 16 are advantageously formed from a single metal sheet defining spaced side arms 16A connected by wall 16B which extends only partway down the length of the arm. The arm portions 16C, 16D located below the wall 16B carry the apertures which are slightly larger than the cross-section of the sleeve C. The side arms 16A are resiliently spread apart. When thus spaced they firmly grasp the sleeve C and prevent the arm 16 from moving axially thereof. If adjustment of the positioning of the arm 16 along the length of the sleeve C is desired, one need merely grasp the extending ends of the arm parts 16C and push them toward one another, thus releasing the grip of those parts on the sleeve C and permitting the arm position to be adjusted. The arm parts 16C may be provided with resilient tongues 60 to facilitate axial location and adjustment. Moreover, the rotative position of the arm 16 relative to the sleeve C may be grossly adjusted within steps permitted by the fluting on the sleeve C. As here specifically disclosed there are three flutes, and hence there are three permissible relative rotative positions for the arm 16. If a greater number of flutes be provided, there will be a correspondingly greater number of possible relative rotative positions for the arms.

Although, as has been described, the sleeve C rotates with the arms 16 and the bushing 46, means must be provided for non-rotatively connecting the sleeve C to the torsion member D at points spaced from the anchored ends 4, 6 of that torsion member in order that the torsion member be twisted when relative movement occurs between the parts A and B.

To that end, slidably mounted on the torsion member D and rigidly rotatable therewith, as by having an internal aperture which mates with the outer periphery of the torsion member D, and also being axially slidable with respect to but rotatable with the sleeve C, as by having an outer periphery engaging the fluted interior of the sleeve C, is a part 64. The axial position of the part 64 relative to the part 46 is determined by the length of a structural member received inside the sleeve C and interposed between the parts 64 and 46.

The element which performs the functions of a retaining clip, that is to say, which retains the ring 38 on the torsion member in proper rotational position and which ensures that the torsion assembly when mounted on the mounting block 18 is in proper rotational position relative thereto, is a ring generally designated 107 which is mounted on the cylindrical end part 42 of the socket member 32 between the part 50 of the bushing 46 and the external gear teeth 34 of the sleeve-like part 32. The ring 107 is thus positioned by being slipped onto the end part 42 before that end part is forced into the recess 44 in bushing 46. The compactness of the subassembly thus produced is ensured by the mating axially outwardly facing inclined surface 109 on the ring 107 and the axially inwardly facing inclined surface 111 on the teeth 34. Formed integrally as a part of the ring 107 are a pair of axially extending fingers 113 and 115 terminating in radially inwardly extending protuberances 117 and 119 respectively. The width and radial extent of the fingers 113 and 115 are such that they are relatively snugly received between a pair of adjacent external gear teeth 39 on the ring 38, the fingers 113 and 115 having a length such, and the protuberances 117 and 119 being so located, as to snap over the ledges 101 formed in the ring 38. Thus when the ring 38 is properly rotatably positioned with respect to the end part 32 it is pushed axially onto that end part, the internal gear teeth 40 on the ring 38 meshing with the external gear teeth 34 on the end part 32, the fingers 113 and 115 interposing themselves between appropriate pairs of external gear teeth 39, until the protuberances 117 and 119 have snapped over the ledges 101. Once this has been done the ring 38 is effectively retained in proper rotative position and is prevented from sliding off the torsion member. The torsion member with the ring 107 as a part thereof may therefore be shipped as a unit to the point of use with assurance that the ring 38 will remain properly positioned thereon. The properly oriented ring 107 then cooperates with an appropriately shaped aperture in the structure on which the variable tension device is to be mounted, to accurately rotatably orient the tension device, thereby accurately determining the forces which the tension device exerts at various positions of the lid or other part being counterbalanced. The socket of the present invention ensures that for a given lid position the force exerted by the tension device will, over an exceptionally long operating life of the device, be what it should be.

Figure 2:
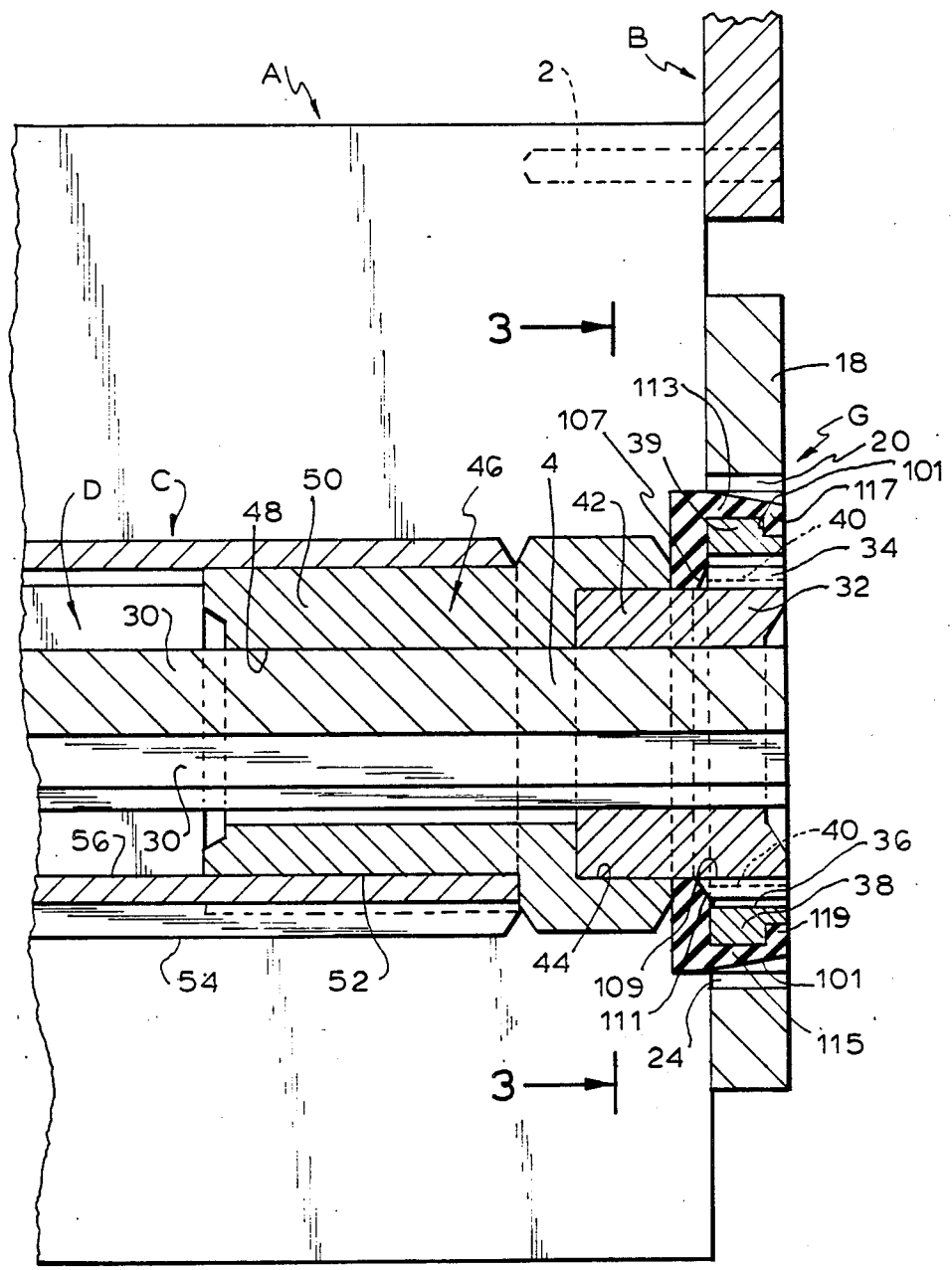
FIG. 2 is a fragmentary longitudinal cross-sectional view of the right-hand portion of the device of FIG. 1.

The improved socket construction of the present invention is shown in FIGS. 3-8 on an enlarged and in some respects exaggerated scale. It should be borne in mind, as will become clear hereinafter, that the dimensional departues of the socket configuration from substantial congruence with the periphery of the torsion member D are quite small, so small that there has been no attempt to show them in FIG. 2. Nevertheless it has been found that those departures from congruency, small though they might be dimensionally, have had a very significant effect in extending the life of the torsion members.

Figure 3:
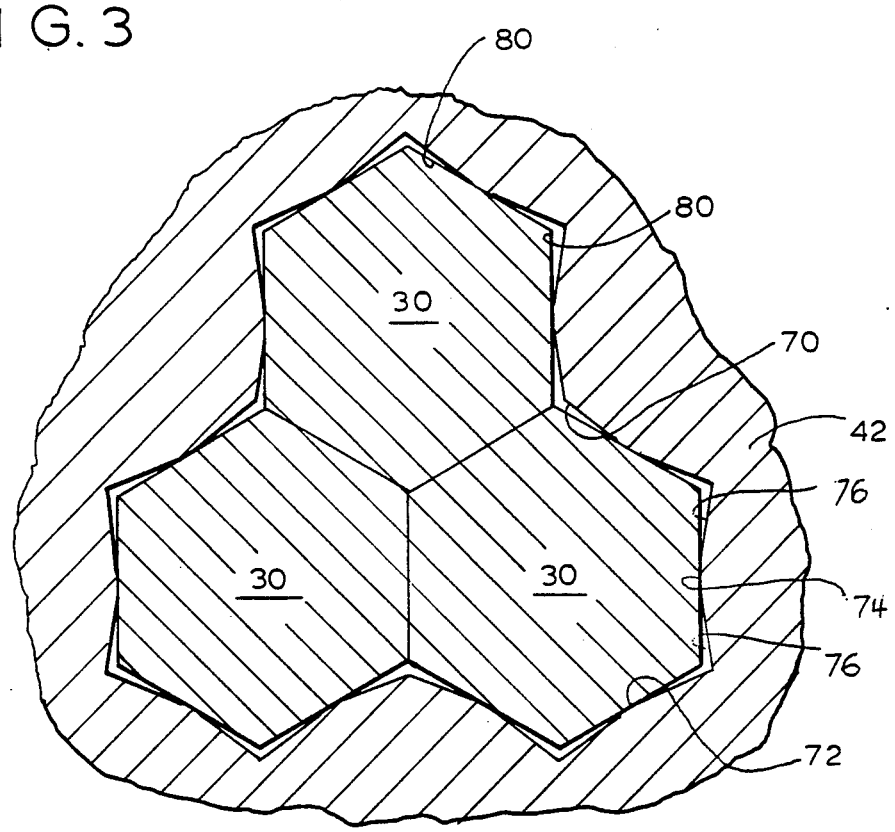
FIG. 3 is a cross-sectional diagrammatic view taken along the line 3—3 of FIG. 1 and showing, on an enlarged scale and in exaggerated form, one aspect of the socket shaping of the present invention, FIG. 3 illustrating the torsion member in place in the socket aperture.
Figure 4:
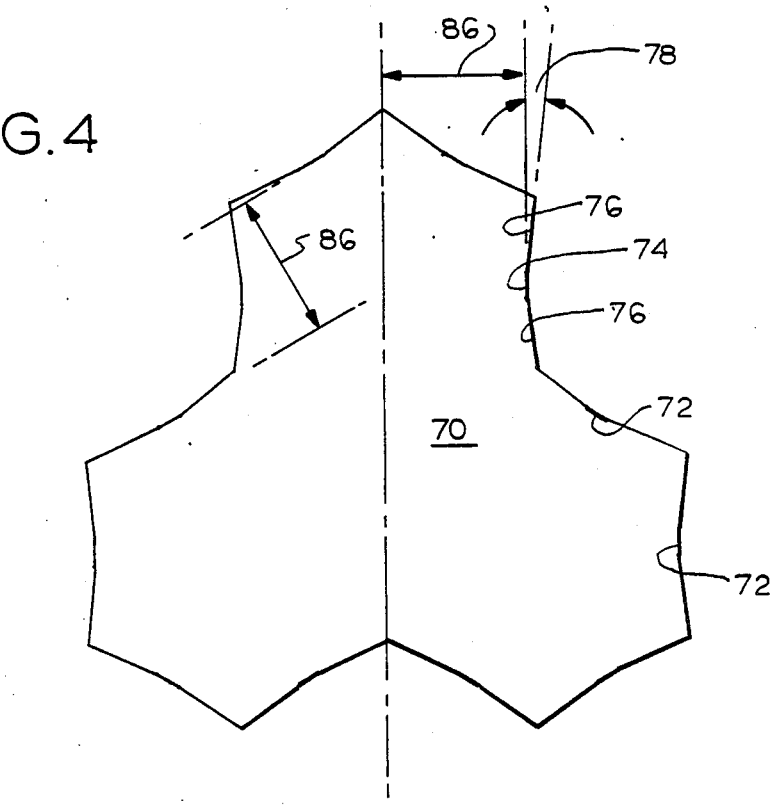
FIG. 4 is a diagrammatic view of the socket aperture of FIG. 3.

As may be seen from FIG. 3, the torsion member D, here specifically disclosed as formed of the three rods 30 having essentially hexagonal cross-sections assembled together as a bunch, defines a polygon having a series of exposed sides generally designated 80 defining a twelve-sided figure, and the aperture 70 of the socket member 42 is generally similarly shaped, so that the bundle of rods 30 can be slid into that aperture 70, the socket member 42 and rods 30 thereafter being non-rotatably engaged with one another. In one commercial embodiment which is here specifically illustrated, each of the rods 30 may be 0.1245 inch wide from flat side to opposite flat side. However, in accordance with the present invention, the aperture walls 72 are not generally flat (as are the exposed sides of the rods 30) nor are they parallel to the sides of the rods 30. Instead, as can perhaps best be seen from FIGS. 3 and 4, those walls 72, when viewed in the direction of the axis of the aperture 70, have a central high point 74 from which surfaces 76 extend back to form progressively lower points. The term "convex" as above defined is here applied to that configuration. The degree of convexity is not great, and in its preferred form is not uniform over the depth of the aperture 70. That degree of convexity, represented by the angle 78 in FIG. 4, may, in the embodiment here illustrated, vary from 2° at a point relatively deep within the aperture 70 to 4.7° at a point relatively close to the end of the aperture 70 from which the operative portion of the rods 30 extend (the left-hand end as viewed in FIG. 2, hereinafter referred to as the mouth of the aperture 70). This is illustrated in FIG. 5, where curve 75a represents the shape relatively deep within the aperture 70, curve 75b represents the shape relatively close to the mouth of the aperture 70 and curve 75c represents the shape at an intermediate depth. It is preferred that the shape vary at an increasing rate as the level approaches the mouth of the aperture. It is preferred, but not essential, that the surfaces have flats at the high points 74, the flats perhaps having a width of 0.010 inch in the illustrated embodiment. In FIG. 5 the broken line 80 represents the location of certain sides of the rods 30 at a depth within the aperture 70 corresponding to the location of curve 75a when the rods are twisted 2° from nominal in a counterclockwise direction as viewed in the figure.

In addition, and as further shown by the curves in FIG. 5, the width of the opening 70 increases slightly from a point relatively deep within the aperture 70 to a point close to the mouth of that aperture, by having the aperture walls 72 flare slightly outwardly toward the mouth of the aperture 70. That increase in width, by way of example, may in the illustrated embodiment amount to only a few ten-thousandths of an inch over an aperture depth of about three-tenths of an inch and is shown by the curves 75a, 75b and 75c.

When the rods 30 are untensioned in the aperture their sides will be generally parallel to the flat high points 74 of the aperture walls 72, and will deep within the aperture more or less engage those high points, with some clearance because the entire bundle must be slightly smaller than the aperture in order to be inserted thereinto. (No clearance is shown in FIG. 3 simply as a matter of illustrative convenience.) When the rods 30 are initially twisted, however, their sides deep within the aperture will engage one or another of the aperture wall portions 76 at that depth, depending upon the direction in which the rods 30 are twisted, FIG. 5 showing that relationship with a 2° counterclockwise twist, as has been noted. At higher levels and with that minimal twist, the sides of the rods will remain spaced from the inner surfaces of the aperture wall 72. As the rods 30 are further twisted their sides will progressively engage the outwardly inclined portions of the inner surfaces of the aperture wall 72 at higher and higher levels moving toward the mouth of the aperture, as represented by the lines 75c and 75b in FIG. 5. This involves not only a twisting of the rods 30 but also a slight lateral bending of the rods, which is accommodated by the divergence, considered axially, of the aperture wall 72 from the side of the rod 30. This is schematically illustrated in FIGS. 6–8. FIG. 6 represents the initial engagement between rod and aperture wall at the level 81 deep within the aperture 70 when the rods 30 are only minimally twisted. That engagement moves up to include level 82 and all of the levels between 81 and 82 when the rods are partially further twisted, as shown in FIG. 7, and that engagement moves further up to include level 84 and all the lower levels when the rods 30 are still further twisted, as shown in FIG. 8. This inherently provides an increasingly greater support area for the rods 30 as they are increasingly twisted. (FIGS. 6, 7 and 8 show the aperture wall 72 as essentially a straight line. This is done solely for purposes of diagrammatic illustration. In fact, as shown by the curve 75a, 75b and 75c of FIG. 5, that divergence is preferably non-linear.) The socket is preferably deep enough so that for maximum torsion element twist, level 84, at the very mouth of the aperture, is not reached. In that way the "notch sensitivity" effect adverted to above is avoided.

In addition, the clearance between the corners of the torsion element and the corners of the aperture contribute to the wear-resistant characteristic of the disclosed torsion element mounting.

In addition, the area of the aperture walls engaged by the torsion member increase as the torsion member is increasingly twisted, thus progressively providing a greater area of support for the torsion member as it is placed under increasing tension and producing lower and more uniform loading stresses in the torsion member.

With conventionally shaped socket apertures some degradation of accuracy appears within the first very few cycles, and appreciable degradation occurs in as few as three to four thousand cycles, but with sockets shaped in accordance with this disclosure no appreciable degradation appears after one hundred thousand cycles.

As has been indicated, the degree of divergence between the aperture walls 72 and the sides of the rods 30 is dimensionally quite small. For example, in the illustrated embodiment the distance 86 (see FIG. 4) may vary between 0.0625 inch and 0.0631 inch over an aperture depth of 0.028 inch.

It will be understood that the noncongruent shaping of the socket aperture need not extend the full depth of the aperture. For example, in the illustrated embodiment the aperture 70 has a total depth of 0.310 inch, and is shaped as here disclosed only to a depth of 0.297 inch from its mouth. Moreover, although the invention has been here specifically disclosed with respect to the socket member 42, it is also applicable to the shaping of the socket apertures in the members 64. It will further be understood that while specific dimensions have been here given to illustrate a preferred embodiment of the present invention as utilized in a counterbalance device of particular size and design, those specific dimensions will vary for different applications. Thus many variations may be made in structural details without departing from the spirit of the invention as defined in the following claims.

I claim:

1. In a variable tension device comprising an elongated torsion member and a socket member having a body with an aperture of significant depth extending to a mouth and defined by walls at least some of which are shaped and oriented to engage sides of said torsion member when a portion of said torsion member is received within said aperture with another portion of said torsion member extending out beyond the mouth of said aperture, thereby to non-rotatably engage said torsion member in said socket member, said wall-side engagement producing the rotative stress between said torsion member and socket member when said other portion of said torsion member is twisted; the improvement which comprises said torsion member sides and said socket aperture walls engaging one another, when said torsion member is in an initial twist condition, at a first location relatively remote from the mouth of said aperture, said torsion member sides and aperture walls diverging from one another to a limited degree from said first location toward the mouth of said aperture, whereby said torsion member sides and aperture walls do not engage at locations closer to said aperture mouth than said first location when said torsion member is in its said initial twist condition, the degree of the divergence from one another of said torsion member sides relative to said aperture walls being such that as said torsion member is further twisted from said initial twist position, at least some of said torsion member sides engage the aperture walls corresponding thereto at second locations closer to the mouth of said aperture than said first location while continuing such engagement essentially at said first location and at points between said first and second locations, thereby to progressively increase the area of engagement as said torsion member is increasingly twisted.

2. The variable tension device of claim 1, in which said sides are essentially parallel to the axis of said torsion member and said walls are inclined outwardly relative to said axis in a direction toward the mouth of said aperture.

3. The variable tension device of either of claims 1 or 2, in which the divergence of said aperture walls from the direction of a central axis of said aperture is in the proportion of about a few ten-thousandths of an inch for a distance from said first location of about 0.3 inch.

4. The variable tension device of claim 1, in which said aperture walls are generally inclined outwardly from an innermost point in a plane at right angles to the axis of said aperture, said walls therefore having a high point and an outwardly inclined portion extending from said high point in a direction at right angles to the axis of said aperture, said torsion member sides, when said torsion member is untwisted, generally engaging said aperture walls at said high point and, as said torsion member is twisted, engaging said walls at said outwardly inclined portion.

5. The variable tension device of any of claims 1, 2 or 4, in which said divergence is such that the point closest to the mouth of said aperture at which said sides and walls engage moves progressively toward said mouth as said further twisting of said torsion member occurs.

6. The variable tension device of claim 4, in which the degree of outward inclination of said portion increases the closer said portion is to the mouth of said aperture.

7. The variable tension device of claim 4, in which the degree of outward inclination of said portion varies from about 2° to about 4.7° the closer said portion is to the mouth of said aperture.

8. The variable tension device of claim 2, in which said aperture walls are generally inclined outwardly when viewed from the mouth of said aperture into said aperture, said walls when thus viewed therefore having a high point and an outwardly inclined portion, said torsion member sides, when said torsion member is untwisted, generally engaging said aperture walls at said high point and, as said torsion member is twisted, engaging said walls at said outwardly inclined portion.

9. The variable tension device of claim 8, in which the degree of outward inclination of said portion increases the closer said portion is to the mouth of said aperture.

10. The variable tension device of claim 8, in which the degree of outward inclination of said portion varies from about 2° to about 4.7° the closer said portion is to the mouth of said aperture.

11. In a variable tension device comprising an elongated torsion member and socket member having an aperture of significant depth extending to a mouth and defined by walls at least some of which are shaped and oriented to engage sides of said torsion member when a portion of said torsion member is received within said aperture with another portion of said torsion member extending out beyond the mouth of said aperture, thereby to non-rotatably engage said torsion member in said socket member, the improvement which comprises said socket aperture walls being generally inclined outwardly from an innermost point in a plane at right angles to the axis of said aperture, said walls therefore having a high point and an outwardly inclined portion extending from said high point in a direction at right angles to the axis of said aperture, said torsion member sides, when said torsion member is untwisted, generally engaging said aperture walls at said high point only at locations spaced from end edges of said sides and, as said torsion member is twisted, engaging said walls progressively towards said end edges at said outwardly inclined portion.

12. The variable tension device of claim 11, in which the degree of outward inclination of said portion increases the closer said portion is to the mouth of said aperture.

13. The variable tension device of claim 11, in which the degree of outward inclination of said portion varies from about 2° to about 4.7° from deep in said aperture to the mouth thereof.

14. The variable tension device of any of claims 1, 2, 4, 6, 7, 8, 9, 10, 11, 12 or 13, in which said torsion member comprises a plurality of elongated elements of polygonal cross-section arranged in a parallel interengaged grouping which exposes some of the sides of some of the elements, at least some of said exposed sides comprising said torsion member sides which engage said socket aperture walls.

* * * * *